United States Patent

[15] 3,658,402
[45] Apr. 25, 1972

Nishida et al.

[54] HOLOGRAM GRAPHIC DATA TABLET

[72] Inventors: Nobuo Nishida; Mitsuhito Sakaguchi, both of Tokyo, Japan

[73] Assignee: Nippon Electric Co., Ltd., Tokyo, Japan

[22] Filed: June 30, 1970

[21] Appl. No.: 51,266

[30] Foreign Application Priority Data

July 4, 1969 Japan....................................44/52497

[52] U.S. Cl. ..............................................350/3.5, 350/96 R
[51] Int. Cl. .........................................................G02b 27/00
[58] Field of Search..........................................350/3.5, 96 R; 33/23–25

[56] References Cited

UNITED STATES PATENTS

| | | | |
|---|---|---|---|
| 3,542,448 | 11/1970 | Reynolds et al. | 350/3.5 |
| 197,885 | 12/1877 | Page | 33/25 R |

OTHER PUBLICATIONS

Vitols, " Hologram Memory for Storing Digital Data," 8 IBM Tech. Disc. Bulletin 1581–1583 (4/1966)
Caulfield et al., " Light Pipe Holography," 6 Applied Optics, 1272 (7/1967)
Van Heerdon, " Theory of Optical Information Storage in Solids," 4 Applied Optics 393–400 (4/1963)

*Primary Examiner*—David Schonberg
*Assistant Examiner*—Robert L. Sherman
*Attorney*—Sandoe, Hopgood and Calimafde

[57] ABSTRACT

A holographic tablet device comprises a recording plate on which an array of holograms is arranged. Each hologram has coded positional information therein corresponding to its location on the plate. The recording plate is illuminated with a collimated monochromatic or substantially monochromatic beam by an indicating device. Diffracted beams are thereby produced corresponding to which of the holograms have been illuminated. The diffracted beams are detected and corresponding binary signals are produced. Also disclosed is an arrangement for maintaining a desired constant angle between the illuminating device and the recording plate.

18 Claims, 13 Drawing Figures

INVENTORS
NOBUO NISHIDA
MITSUHITO SAKAGUCHI
by
Sandoe, Hopgood & Calimafde
ATTORNEYS

*INVENTORS*
NOBUO NISHIDA
MITSUHITO SAKAGUCHI
by
Sandoe, Hopgood & Calimafde
ATTORNEYS INVENTORS
NOBUO NISHIDA
MITSUHITO SAKAGUCHI
by
Sandoe, Hopgood & Calimafde
ATTORNEYS

HOLOGRAM GRAPHIC DATA TABLET

The present invention relates generally to tablet devices for applying coded hand written information as an input to an information processing apparatus such as a computer and the like, and more particularly, to a tablet device employing holographic techniques.

Heretofore, the known tablet devices of this type for encoding hand written information were provided with a light pen or the like, and the coded hand written information was applied to an information processing system. The positions along the X-axis and the Y-axis are respectively detected and the positional information along the respective axes are encoded into a dual code to be fed as an input to the processing apparatus. This type of tablet devices, however, has a disadvantage in that in order to enhance the resolving power of the device, a complex electric circuit, for example an analog-to-digital converter, was required. As a result the entire device is expensive and subject to operational difficulties.

It is an object of the present invention to provide a tablet device for converting hand written information directly into a coded electrical signal by making use of a holographic technique, without the use of an analog-to-digital converter.

It is another object of the present invention to provide a simpler tablet device making use of a photochromic glass as a displaying means of hand written information.

It is a further object of the present invention to provide a hologram tablet device having an illuminating means maintained on a recording plate at a substantially constant angle of incidence.

It is yet a further object of the present invention to provide a hologram tablet device having an illuminating means of which the movement is facilitated and the movable scope is expended.

According to the present invention, a tablet device is provided which comprises one or two sheets of recording plates each having an array of number of small holograms in which a coded positional information corresponding to the position of the hologram is recorded. Drawing means are provided consisting of means for indicating the hologram, and means for radiating a collimated monochromatic or substantially monochromatic beam onto the hologram. Means are arranged in predetermined directions with respect to the recording plates for detecting diffracted beams in accordance with the coded information from the recording plates, and means are provided for identifying coded electric signals from the detecting means.

To the accomplishment of the above and to such further objects as may hereinafter appear, the present invention relates to a holographic tablet device substantially as defined in the appended claims and as described in the following specification taken together with the accompanying drawings in which:

Figures 6, 7, 8, 9:
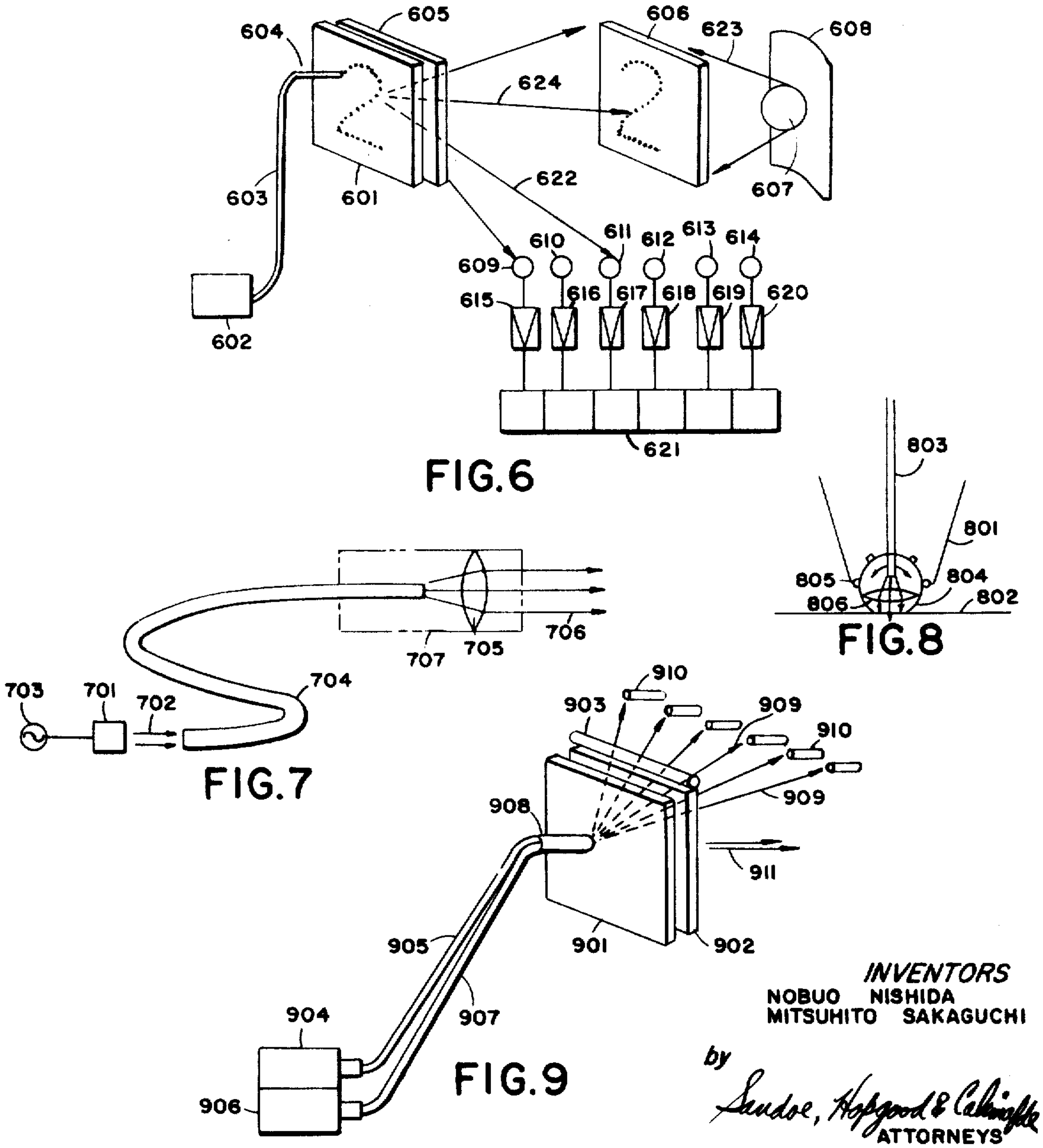
FIG. 6 is a schematic illustration of another embodiment of the present invention having a photochromic glass as a displaying means.
Figures 10, 11:
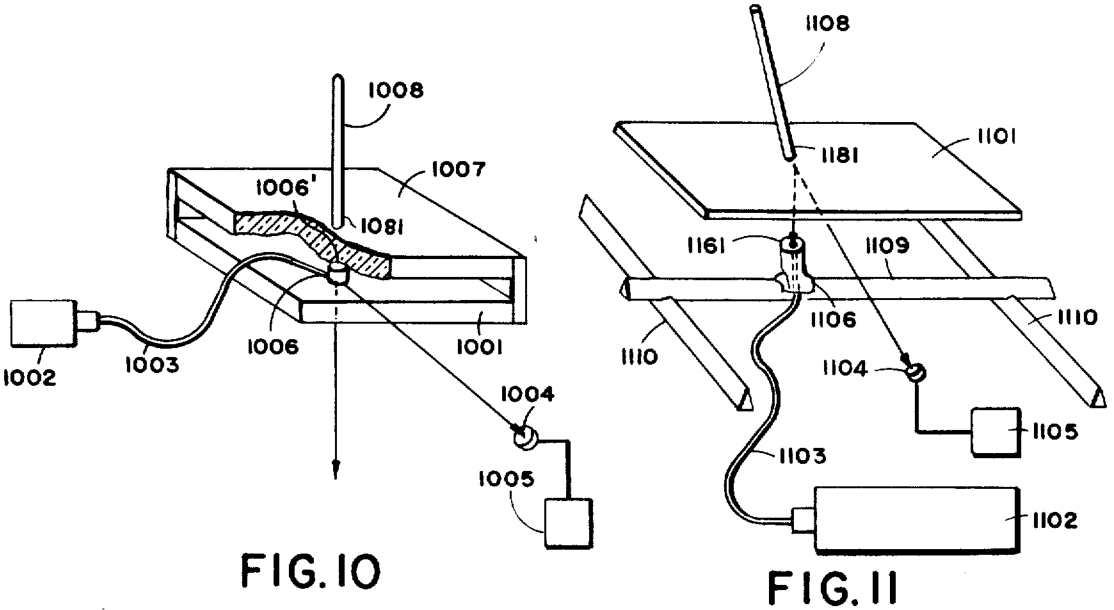
Figures 12, 13:
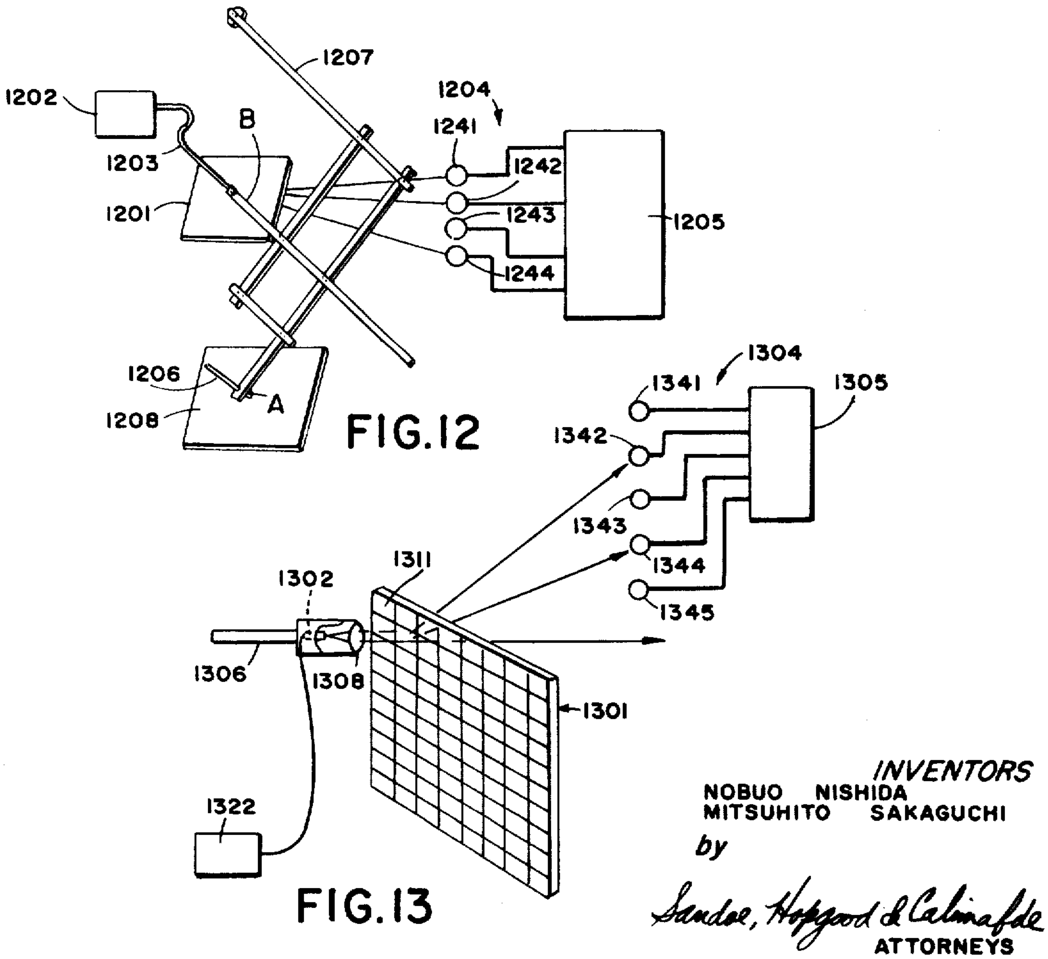

FIG. 7 schematically illustrates a light pen for use with the embodiment of FIG. 6;

FIG. 8 is a sectional view showing the structure of the apex of the light pen of FIG. 7;

FIG. 9 schematically illustrates another embodiment of the invention in which the photochromic glass is employed as the displaying means;

FIG. 10 schematically illustrates an embodiment of the moving means for use in the present invention;

FIG. 11 schematically illustrates another embodiment of the moving means;

FIG. 12 schematically illustrates yet another embodiment of the moving means; and FIG. 13 schematically illustrates the indicator section and the irradiating section of the drawing means in an integral structure.

Figures 1, 2, 3, 4:
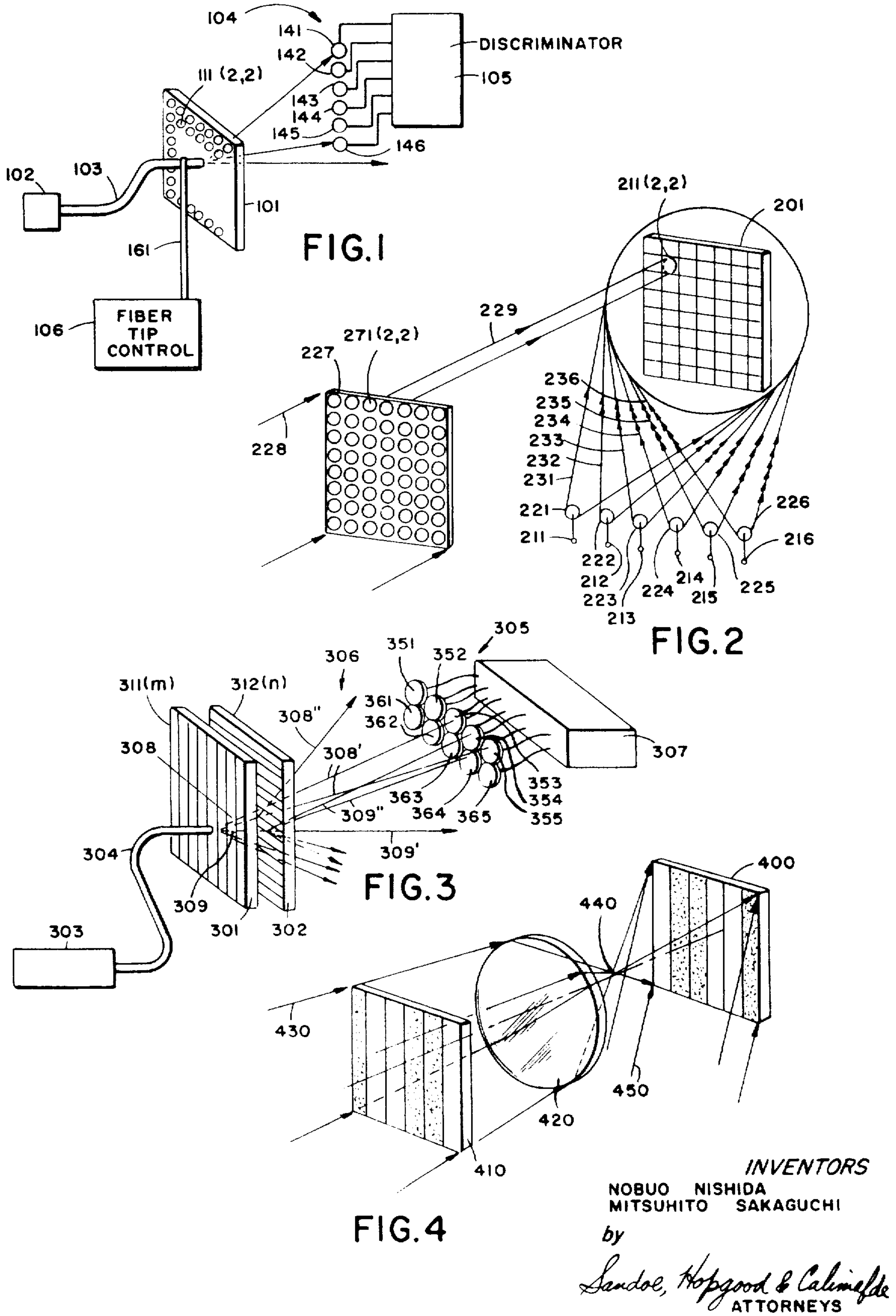
FIG. 1 is a schematic illustration of an embodiment of the present invention.
FIG. 2 is a schematic illustration of a method of manufacturing a recording plate for use in the embodiment of FIG. 1.
FIG. 3 is a schematic illustration of another embodiment of the present invention.
FIG. 4 is a view similar to FIG. 2 illustrating a method for manufacturing a recording plate for use with the embodiment of FIG. 3.

FIG. 1 illustrates the principle and construction of an embodiment of the present invention, wherein a recording plate 101 includes a plurality of small holograms 111 arranged on plate 101 in a matrix-like array. In this embodiment, assuming that the information quantity of each of the small holograms is six bits, the coded positional information given by each of small holograms 111 is represented by six bits. As the result, $2^6$=64 pieces of small holograms are arranged on recording plate 101.

A coherent light source 102 such as a laser oscillator produces a coherent light beam, and a self focusing optical fiber 103 or a fiber glass, leads the light flux emitted from coherent light source 102 onto recording plate 101. A detector 104 consisting of photo-electric transducer elements 141–146 is positioned to the other side of recording plate 101 and detects the diffracted light from the recording plate 101. In the embodiment of FIG. 1, six transducer elements corresponding to the informational or bit quantity of each of the small holograms 111 are employed in detector 104. A discriminating circuit 105 discriminates positions by receiving outputs from the detector 104, and a tip control means 106 transfers the tip end of self-focusing optical fiber 103 onto recording plate 101 corresponding to the transfer of the object to be controlled. The position of recording plate 101 and photo-electric transducer elements 141–146 is relatively fixed as will be described below.

For example, assume that the tip end of self-focusing optical fiber 103 is transferred onto small hologram 111 (2, 2), and a coherent light flux is incident thereon. At this time, if the memorized information of small hologram 111 (2, 2) is in the form of (0, 0, 1, 0, 1, 0), the light diffracted by this hologram 111 (2, 2) is received only by transducer elements 143 and 145 of detector 104, and cannot be received by the other transducer elements 141, 142, 144 and 146. Accordingly, the digital signal train (0, 0, 1, 0, 1, 0) is given to the discriminating circuit 105, and the position of the object to be controlled is discriminated by this digital signal train. Accordingly, it is possible to carry out a positional control of the object to be controlled by means of known control means of numerical values.

FIG. 2 shows a method for forming a recording plate having a plurality of the small holograms such as that used in the embodiment of FIG. 1. A recording plate is made, for example, of a photographic plate. An arrangement of point sources 221–226 is formed by dividing and converging a single coherent light beam. Each of these point sources can be respectively switched by the encoded signals applied to respective terminals 221–216, and the coherent beams 231–236 respectively projected from each of the light point sources can respectively irradiate the whole surface of recording plate 201. A shutter plate 227 passes therethrough only a portion of an incident coherent light beam 228, such as portion 229, and shuts out the other portions. Shutter plate 227 has a plurality of shutters 271 (in the drawing 56 pieces) according to the number and position of the small holograms to be formed on recording plate 201.

In the event that a code (0, 0, 1, 0, 1, 0) is recorded at the small hologram 211 (2, 2) shutter 271 (2, 2) corresponding to the position of the hologram to be recorded is opened, and portion 229 of coherent light beam 228 is passed through shutter 271 (2, 2) to illuminate a position 211 (2, 2) on recording plate 201. The third light source 223 and the fifth light source 225 corresponding to the code (0, 0, 1, 0, 1, 0) illuminate the entire surface of the recording plate in advance.

Therefore, the interference fringes formed by the light beam 229 and the light beams 233 and 235 are recorded in the recording plate at the position 211 (2, 2). A similar apparatus for applying holographic data on a tablet is described in our co-pending application Ser. No. 878,142.

Similarly, predetermined interference fringes are recorded at a predetermined position by opening a shutter 271 ($m$, $n$) corresponding to a position 211 ($m$, $n$) of recording plate 201 so as to pass through the coherent light beam, while, on the other hand, by illuminating the recording plate 201 by point light sources 221–226 according to the coded positional information previously given to the position.

In this way, recording plate 201 is completed in which the coded positional information of the arranged position of the recording plate shown in FIG. 1 is recorded as the interference fringes of the hologram. It is to be understood, that the forming of the recording plate of FIG. 1 can also be obtained by methods other than that illustrated in FIG. 2, such as by preparing each of the small holograms separately, and arranging and then fixing them on the recording plate.

In addition, the recording plate 101 may be produced by another method such as, for example, that shown in FIG. 4 and described below. In self-focusing case, at first, one dimensional binary mask is prepared, and this mask is illuminated by a coherent beam. The image of the binary mask through a lens and a reference beam from one direction are illuminated onto a recording plate consisting of a photographic plate, and the interference fringes between the image and the reference beam are recorded in the same recording plate in an overlapped relationship. As above described, two-dimensional information is thereby recorded in one recording plate.

When the small holograms on the recording plate thus formed are illuminated by the coherent narrow beam, the primary diffracted beams corresponding to the interference fringes recorded in the small holograms are provided. Since the interference fringes in each of the small holograms are recorded by illuminating the recording plate from the predetermined directions, as shown in FIG. 2, the primary diffracted beams projecting from each of the holograms always project in predetermined directions. Accordingly, when photo-electrical transducer elements are arranged at the projecting directions of the primary diffracted beams, the beams are received at the elements, and the light information is converted into a corresponding electrical signal.

Thus, the coded positional information (0, 0, 1, 0, 1, 0) of the small hologram 111 (2, 2) in FIG. 1 is obtained as an electrical signal. In the case that the coherent light beam is illuminated on the other small holograms, shown generally by 111 ($m$, $n$), a coded information corresponding to the position of that small hologram can also be obtained.

Therefore, according to the embodiment of FIG. 1, the movement of the tip end of the self-focusing optical fiber 103 can be converted directly into a digital signal without the use of an analog-to-digital converter, and it is thus possible to obtain a light pen device or a position detector for controlling numerical values having a simple construction.

In the above mentioned embodiment, the emitting portion of a coherent beam is moved using a self-focusing optical fiber, but the same effect can be also obtained when the emitting position of a coherent light is fixed at a predetermined position, and the recording plate is moved. In this case, since the recording plate and the photo-electric transducer elements are not cooperated, a recording plate must be formed so that the diffracted beams due to each of the small holograms on the recording plate are projected at these predetermined positions (that is, on the photodetector elements).

FIG. 3 shows a basic construction of another embodiment of the present invention in which two sheets of the recording plates 301 and 302 are employed. Each of the recording plates keeps coded positional signals in the direction of one of the dimensions. Coded signals in the direction of one of the dimensions is obtained from one plate, and coded signals in the direction of the other dimension is obtained from the other plate.

Recording plates 301 and 302 respectively contain elongated holograms 311 ($m$) and 312 ($n$), each having coded positional information corresponding to a slit position. The recording plates are placed in close contact with each other in a manner such that the respective slit-like holograms 311 ($m$) and 312 ($n$) intersect at a right angle with each other. A coherent light source 303, such as a laser light source, applies a coherent light beam to an indicating means 304 consisting of a flexible optical path such as, for instance, a self-focusing optical fiber. A first detector 305 consisting of photo-electric transducer elements 351–355 detects the diffracted light beams from the recording plate 301, a second detector 306 consisting of photo-electric transducer elements 361–365 detects the diffracted beams for recording plate 302, and a discriminating device 307 receives the output signals from the detectors 305 and 306. If it is assumed that the slit-like holograms 311 (5) and 312 (8) of recording plates 301 and 302, respectively, are indicated by indicating means 304, then the coherent light projected onto slit-like hologram 311 (5) is divided into the diffracted beams 308 according to the coded information recorded in slit-like hologram 311 (5) for instance, interference fringes of (0, 0, 1, 0, 1), and the zero order beam 309 which has not been affected by the interference fringes. The percentage of the diffracted beams 308 with respect to the zero order beam 309 is of the order of a few percent, and thus most of the projected light becomes the zero order beam 309.

The diffracted beams 308 and the zero order beam 309 passed through the slit-like hologram 311 (5) of recording plate 301 are successively projected onto recording plate 302. Both the diffracted beam 308 and the zero order beam 309 are diffracted by recording plate 302, the diffracted beam 308 being divided into the diffracted beam 308'' and a zero order beam 308'. Since detector 305 is provided to receiver zero order beam 308', the photo-electrically converted signals from detector 305 take the form of (0, 0, 1, 0, 1). The zero order light beam is projected onto the slit-like hologram 312 (8) of recording plate 302, and is then divided into a diffracted beam 309'' and a zero order beam 309' in accordance with the coded information recorded on that hologram such as, for instance, interference fringes of (0, 0, 1, 1, 0).

Since detector 306 receives diffracted beam 309'', the photo-electrically converted signals from detector 306 take the form of (0, 0, 1, 1, 0). Although the beam projected onto slit-like hologram 311 (5) encounters the coded information (0, 0, 1, 0, 1) at any position along the direction of that slit, and the beam projected onto the slit-like hologram 312 (8) encounters the coded information (0, 0, 1, 1, 0) at any position along the direction of that slit, the position where the coded information (0, 0, 1, 0, 1; 0, 0, 1, 1, 0) can be obtained, is only the position where the slit-like holograms 311 (5) and 312 (8) intersect one another. This information can be identified by means of discriminating device 307, and it is thus possible to identify the point indicated by indicating means 304. Therefore, when indicating means 304 is moved on recording plates 301 and 302 so as to depict any arbitrary figure, digital electric signals representing the locus of movement of the indicating means can be obtained from the detector devices 305 and 306. If these electric signals are transmitted, a transmission of hand written information is enabled which can be directly fed to an information processing apparatus such as a computer.

The method for manufacturing the recording plate including slit-like holograms to be used in the embodiment of FIG. 3 is now described with reference to FIG. 4. In FIG. 4, a recording plate 400, which may be utilized as either of plates 301 or 302 in the embodiment of FIG. 3, consists of, for instance, a photographic plate. A binary pattern mask 410 consists of transparent and opaque slits equal in number to the number of slit-like holograms to be formed in the plate, the transparent and opaque slits respectively representing "0" and "1"

signals. Binary pattern mask 410 shows the information of the respective slits at the position of one element of one detector such as, for instance, the element 351 in FIG. 3. A lens 420 projects the image of binary mask 410 onto recording plate 400. When the binary pattern mask 410 is illuminated by a collimated coherent light beam 430, the beams are converged at the position of the focal point 440 of lens 420 and then projected onto recording plate 400 to form the image. The respective distances between the recording plates 301 and 302 and the detectors 305 and 306 in FIG. 3, is set to be equal to the distance between recording plate 400 and focal point 440 in FIG. 4.

The interference fringes between the image of binary pattern mask 410 projected by lens 420 and a reference beam 450 which illuminates the entire surface of recording plate 400, are recorded on the recording plate. By thereafter changing the direction of reference beam 450, interference fringes between the reference beam and an image of binary pattern mask 410 having a different transparent opaque slit pattern corresponding to the direction of the reference beam, are recorded on the recording plate in an overlapped relationship. Assuming that the first binary pattern mask 410 represents the respective slit information at the element 351, the next binary mask 410 represents the respective slit information at the element 352.

It will be seen that if the respective slits of the recording plate are illuminated with a collimated beam, the diffracted beams for the coded information are then always reassembled at the positions corresponding to the focal point 440 at an interval corresponding to the respective directions of the reference beam as many as the number of the multiple recordings.

As will be seen from the above description, a tablet device is realized by combining two sheets of recording plates each having slit-like holograms recorded thereon, resulting in easy manufacture of the recording plates, the tablet device also has a high reliability owing to the fact that the amount of the light refracted into the detectors is increased.

When the recording procedure described above has been repeated as many times as the number of elements of detector 305 or 306 while varying the binary pattern mask 410 and the direction of the reference beam 450, the manufacture of the recording plate is completed. It should be, however, understood that the recording plates 301 and 302 may be manufactured by other procedures such as the method illustrated in FIG. 2.

In the above described embodiment, a means for confirming a hand written information is not described, but in another aspect of the present invention means are provided for displaying hand written information in which a photochromic glass is employed.

Figure 5:
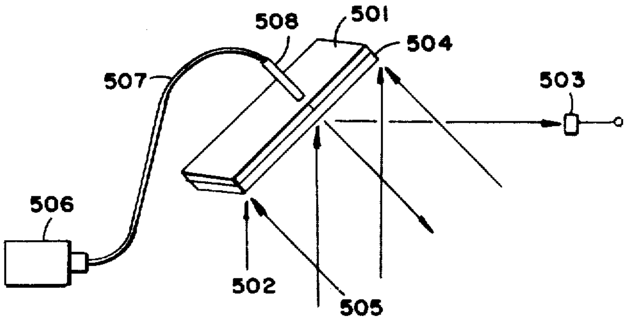
FIG. 5 is a schematic illustration of an embodiment of the present invention in which a photochromic glass is employed as a displaying means.

A photochromic medium is a medium which is blackened by irradiating the medium with one wavelength of light and bleached by another wavelength of light. FIG. 5 shows an embodiment of the invention in which a photochromic glass is employed. That embodiment comprises a recording plate 501 in which a number of small holograms is arranged, and which is bleached by a suitable wavelength of light to become transparent. A coherent collimated light beam 502 is emitted from a coherent light source (not shown) such as, for instance, a laser light source, and a detector 503 is placed at a predetermined position. A photochromic glass 504 is superposed with the recording plate 501, and a near ultraviolet light 505 irradiates the whole surface of photochromic glass 504 from a light source (not shown) to thereby blacken the photochromic glass. A near infrared light source 506 is utilized to bleach the photochromic glass, and the light emitted from near infrared light source 506 is conducted to recording plate 501 through a flexible light-guide 507 such as, for example, a glass fiber or a self-focusing optical fiber. The tip end of the guide is made thick for ease of gripping so as to form a grip or handle 508.

By holding grip 508 and indicating an arbitrary point on a small hologram of recording plate 501 with the tip end, such that the near infrared light beam emitted from the tip end of grip 508 passes through the transparent recording plate 501 and enters into the photochromic glass 504, the incident portion of photochromic glass 504 is bleached. While the entire surface of photochromic glass 504 is irradiated by coherent light 502, it has also been irradiated by a near ultraviolet light 505, so that photochromic glass 504 has been activated, and coherent light 502 does not enter into the recording plate 501.

However, when a part of photochromic glass 504 is bleached by the infrared light beam, coherent light 502 passes through the bleached portion and enters into the recording plate 501, and the light 502 is diffracted by the coded positional information recorded in the respective small holograms at the incident portion, and the diffracted light beam passes through the bleached portion of photochromic glass 504 and is received by detector 503. Consequently, the coded positional information can be obtained at detector 503 in the form of electrical signals. By transferring grip portion 508, photochromic glass 504 is bleached successively in response to the movement of grip 508, and the coherent light enters into the respective small holograms according to the locus of the movement and is diffracted. As the diffracted light beam enters into the detector, a train of digital electrical signals showing the locus depicted by grip 508 is obtained by detector 503.

According to the embodiment of FIG. 5, since the locus depicted by grip 508 remains lightly as a bleached residual image on photochromic glass 504 in such a degree that coherent light 502 substantially does not pass through the photochromic glass, confirmation of the hand written figure thus becomes possible.

In the above described example, a recording plate in which a number of small holograms are arranged is described, but, it will be seen that the recording plates having the slit-like holograms of FIG. 3 may also be employed.

FIG. 6 illustrates another embodiment of the invention in which photochromic glass is employed. In this embodiment, a recording plate 601 similar to those of the previous embodiments comprises a number of small holograms. A coherent light source 602 produces a coherent light beam guided by a light guide 603 to a light pen 604. Pen 604 thus provides a coherent collimated light beam on the incident surface of recording plate 601. A filter 605 which cuts off ultraviolet light and transmits visible light is positioned adjacent plate 601 on the side opposed from light pen 604 and a photochromic glass 606 having a characteristic in which the illumination of ultraviolet light causes it to blacken and the illumination of visible light in long wavelength, for instance, 6328A., of an oscillation wavelength of a He-Ne gas laser, causes it to bleach to be transparent is placed from filter 605. A light source 607 such as a mercury arc lamp radiates ultraviolet and visible light and a concave mirror 608 effectively reflects the light from light source 607 onto photochromic glass 606. An array of photo-detector elements 609–614 are located in the direction along which primary diffracted light rays are radiated from recording plate 601. Amplifiers 615–620 are respectively coupled to detector elements 609–614 and amplify electric inputs derived by those elements. A register 621 is coupled to the amplifier outputs and stores the amplified electrical signals for transmission to an external information processing device such as a computer. A system similar to that shown in FIG. 6 is also disclosed in our said co-pending application.

In the operation of the embodiment of FIG. 6, light 623 radiated by light source 607 has previously illuminated photochromic glass 606 to thereby blacken the photochromic glass by ultraviolet light from light source 607. If an operator then depicts a pattern of letters or figures on recording plate 601 by utilizing the light pen 604, the coherent collimated light beam emitted from light pen 604 is diffracted in accordance with the interference fringes recorded in the small holograms of the recording plate 601. The zero order beam 624 from recording plate 601 irradiates the photochromic glass 606, and the first order diffracted beams 622 emit to photo detector elements 609 to 614.

As the zero order light beam 624 moves according to the movement of light pen 604, if the wavelength of coherent light radiated from light source 602 is selected at 6328A., wherein the photochromic glass becomes transparent, only these portions of photochromic glass 606 illuminated by zero order beam 624 become transparent, and the image of the visible light from light source 607 is displayed through the transparent portions of the photochromic glass. Therefore, the confirmation of the hand written information can be performed through filter 605 and transparent recording plate 601. It is to be understood that the displayed pattern on photochromic glass 606 is the same one as the pattern of letters or figures depicted on recording plate 601 by light pen 604. If the intensities of the ultraviolet light from light source 607 and the light radiated from light source 602 are selected at appropriate values, it is possible to control the visual persistance characteristic of photochromic glass 606.

On the other hand, the first order diffracted beams 622 reproduce a binary code recorded on the small hologram selected by the light pen 604. That code is received by photo-detector elements 609–614 arranged in the direction of the first order diffracted beams.

The first order diffracted beams 622 are projected in the direction defined by the position of the light source at the time of the construction of the recording plate 601, irrespective of the position of light pen 604, so that the coded optical information from the recording plate is converted into electrical signals in the respective photo-detector elements 609–614, and the electric signals are amplified by the respective amplifiers 615–620 and accumulated in register 621. In the embodiment of FIG. 6 photochromic glass 606 and recording plate 601 are separated, but they can if desired be arranged in contact with each other. It is also possible to position the photochromic glass and the recording plate closer to each other by providing a prism having a characteristic of transmitting the zero order beam and reflecting the total of the first order beams.

FIG. 7 schematically illustrates the construction of a light pen for projecting a coherent collimated light beam to a recording plate such as that used in the previously described embodiment. As shown, a light source 701 radiates a single wavelength light 702, and a laser oscillator and a tungsten lamp to which a interference filter is attached are employed. A power source 703 drives light source 701, and can if desired employ a device for chopping the beam produced by light source 701. A light-guide 704 consisting of a flexible optical fiber receives the light beam output from light source 701 at one end and a lens 705 is positioned at the other end of light-guide 704 for converting the light beam emitted from the light-guide into a collimated light beam 706. The end of guide 704 and 705 are housed in a case 707 of the light pen. As is apparent from FIG. 7, a light beam of a single wavelength guided through light-guide 704 is collimated by lens 705 and the collimated light is provided on a recording plate. However, even though the light beam from the light pen is a collimated beam, it is difficult to precisely reproduce the positional information recorded in the recording plate at the detector unless an operator utilizes the light pen at an angle perpendicular to the recording plate or at a constant angle to the plate.

FIG. 8 is a sectional view showing the apex of a light pen that is effective in this respect wherein a light pen 801 is positioned adjacent a recording plate 802. A flexible optical fiber 803 leads a light beam from a light source following exactly the movement of the light pen. A spherical body 804, of which a portion is cut, is supported by a ring body 805 for supporting the spherical body rotatably in all directions. A lens 806 is positioned within body 804 at the end of fiber 803. The single wavelength light beam passed through the light-guide 803 is collimated by lens 806 and is radiated onto recording plate 802 and even if an operator inclines light pen 801 in an oblique direction, the spherical body 804 moves independently of light pen 801 as far as the apex of spherical body 804 closely contacts the recording plate 802, and hence the relative position between the apex of optical fiber 803 and lens 806 is invariable and the collimated light beam is always emitted in a constant direction and applied to the recording plate 802. It is thus possible to decrease errors in reproduction. Moreover, a design in which the switch of the light source turns on at the same time that spherical body 804 contacts recording plate 802 is very preferable.

FIG. 9 illustrates yet another embodiment of the invention that is less complex than the embodiment of FIG. 6. That embodiment comprises a recording plate 901 having a plurality of the small holograms and a bleached photochromic glass 902 is activated by illumination of ultraviolet lights by such bleach. A light source 903 radiates infrared light for erasing images on the photochromic glass by the ultraviolet light, and a light source 904 such as a laser source radiates a light of a single wavelength. A light-guide 905 guides light from light source 904. A light source 906 radiates ultraviolet light, and a light-guide 907 guides light produced by source 906. Light-guides 905 and 907 terminate in a light pen 908 which may be used for drawing letters, figures, or the like on the recording plate 901. First order diffracted beams 909 are emitted from recording plate 901 and are received by photo-detector elements 910. A zero order beam 911 passes through photochromic glass 902.

In the operation of the embodiment of FIG. 9, the light beams for laser light source 904 and ultraviolet light source 906 are guided respectively by light-guides 905 and 907 and are bundled and placed onto recording plate 901. The laser light beam radiated on the recording plate 901 causes zero order beam 911 and the first order diffracted beams 910 by interference fringes in recording plate 901 and they pass through photochromic glass 902. Since the emitting directions of the first order diffracted beams are defined by the interference fringes recorded at the respective small holograms in plate 901, the first order diffracted beams are received only at photo-detector elements 910 placed in the emitting direction of the first order diffracted beams.

Similar to the embodiment of FIG. 6 the received beams are converted into electric signals by the photo-detector elements 910. The electric signals are amplified and the amplified electric signals are applied to an external information processing device as the input. In addition, the zero order beam passing through photochromic glass 902 can also be applied to other display devices as the input. The ultraviolet light illuminating recording plate 901 together with the laser light is transmitted through recording plate 901 and is incident on photochromic glass 902. The illumination of the ultraviolet light causes photochromic glass 902 to blacken and the same pattern as the one drawn on the recording plate 901 by light pen 908 is depicted on photochromic glass 902. Accordingly, the movement of light pen 908 can be confirmed by the pattern displayed on the photochromic glass 902. The visual persistence time of photochromic glass 902 can be changed arbitrarily by changing the intensity of the ultraviolet light, and if it is required to swiftly erase the pattern on photochromic glass 902, it is possible to erase the pattern by radiating the plate with the infrared light from light source 903.

In the embodiment of FIG. 9, the use of the bleached photochromic glass as the displaying means avoids the requirement that the photochromic glass be previously blackened by ultraviolet light, and it is possible that the zero order beam be displayed on other displaying devices, and the displayed pattern on the displaying device be utilized for other uses. Since light-guides 905 and 907 are arranged in slightly separate positioned relation, there is no danger that the laser light beam from light guide 905 will be interrupted due to the figure displayed by the blackening of photochromic glass 902. Therefore, it is easy to closely contact a photochromic glass with a recording plate.

In the tablet device of the present invention, as noted above, it is necessary that a coherent light beam illuminated from an emitting means always be held at a constant incident angle to a recording plate having a plurality of the small holograms. If the constant angle is not maintained, the diffracted beams emitted from a recording plate do not enter into a detector consisting of photo-detector elements correctly, so it will be difficult to detect correct coded informations at the detector.

Therefore, the present invention in another of its aspects, includes means for maintaining a constant incident angle of a coherent light beam on a recording plate. FIG. 10 illustrates an embodiment of the aforementioned means in which a recording plate 1001 receives light from a coherent light source 1002 such as a laser light source, by means of a flexible light guide 1003. A detecting device 1004, only one of which is illustrated typically for the simplification of the drawing, is coupled to a discriminating device 1005. An illuminating means 1006 is provided at the tip end of light guide 1003 for maintaining a constant incident angle of the coherent light radiated from the light guide 1003 on the recording plate 1001. A drawing plate 1007 is disposed in parallel and in a spaced apart relationship from recording plate 1001.

Between the drawing plate 1007 and the recording plate 1001, there is disposed the above described illuminating means 1006 so that the latter can be moved as desired. An indicating means 1008 is moved along the surface of drawing plate 1007 so that a desired alphanumeric drawing, or the like, may be written on plate 1007. A permanent magnet 1081 is provided at the tip end of indicating means 1008, and a permanent magnet 1006' is provided on the tip of the illuminating means 1006. The magnetic pole of magnet 1006' is selected so as to attract the magnet 1081. Therefore, the illuminating means is movable between the drawing plate 1007 and the recording plate 1001 corresponding to the locus of the indicating means 1008. As a result, the coherent light beams emitted from illuminating means 1006 successively illuminates the small holograms on the recording plate 1001, and the diffracted beams by the respective small holograms are detected by detector 1004 so that electric signals corresponding to the coded positional information of the respective small holograms are obtained therefrom. Discriminating means 1005 identifies the digital electric signals taken out of the detecting means 1004.

In the embodiment of FIG. 10, illuminating means 1006 and indicating means 1008 are separately provided, and the coherent light beam from irradiating means 1006 is projected onto the recording plate 1001 at a constant angle of incidence even if a desired drawing is written by indicating means 1008 at an arbitrary angle. For this reason, the drawing of a figure can be exercised easily and the recorded information on recording plate 1001 can be accurately received at detecting means 1004.

In this embodiment permanent magnet 1006' and permanent magnet 1081 are employed as an attracting means for making the indicating means 1008 and the illuminating means 1006 cooperate, but it will be apparent to those skilled in the art that the attracting means is not necessarily limited to those permanent magnets, but any kind of members attracted between each other (such as, a combination consisting of an electromagnet and a metal or a magnet or the like) may be employed for the same purpose.

FIG. 11 shows another embodiment for maintaining the illuminating means at a constant angle of incidence with respect to the recording plate. In the previous embodiment shown in FIG. 10, illuminating means 1006 is merely interposed between recording plate 1001 and drawing plate 1007, and there is a possibility of illuminating means 1006 being placed in an inclined manner.

In the embodiment of FIG. 11, this tendency of the illuminating means is eliminated. As shown in FIG. 11, that embodiment comprises a reflecting type of recording plate 1101, a coherent light source 1102, and a flexible light guide 1103 guiding light from source 1102. A detecting device 1104, which is represented by one photo-detector element for simplification, is connected to a discriminating device 1105. The embodiment also comprises an illuminating means 1106, an indicating means 1108, an X-directional rail 1109, a Y-directional rail 1110, and permanent magnets 1161 and 1181, the former being carried on illuminating means 1106 and the latter being carried on indicating means 1108.

As shown in FIG. 11, illuminating means 1106 is mounted on X-directional rail 1109 in a freely slidable manner, and X-directional rail 1109 is futher freely slidably mounted on Y-directional rail 1110. As a result, illuminating means 1106 is moved by the attracting force between the permanent magnets 1181 and 1161 in accordance with the locus drawn by the indicating means 1108, whereby the digital electric signals corresponding to the locus can be obtained from the detecting device 1104.

In the embodiment shown in FIG. 11, since a reflecting type of recording plate consisting of reflecting type holograms is employed, the drawing plate, designated by reference numeral 1007 in the embodiment of FIG. 10, is not required, and a desired figure can be drawn directly on recording plate 1101 by indicating means 1108. More specifically, since the illuminating means 1106 is freely slidably mounted on X-directional rail 1109, it can be freely moved along the plane determined by the rails extended in the X and Y directions. However, there is no danger that the illuminating means incline to the recording plate because of the above described construction prohibiting the movement of illuminating means 1106 in other directions.

Furthermore, it will be apparent that the use of the rails extending in the X and Y directions may also be employed in the embodiment of FIG. 10 between the recording plate 1001 and the drawing plate 1107. Moreover, the illuminating means 1106 in the FIG. 11 embodiment may also be mounted on the X-rail so that it is freely slidable on the rail.

FIG. 12 illustrates another embodiment for maintaining the illuminating means at a constant incident angle to the recording plate. In this embodiment, an arbitrary pattern can be depicted on a sheet of paper by a drawing tool and digital electric signals representing a locus similar to that of the drawn pattern on the paper are obtained from a detector. This embodiment includes a recording plate 1201 and a coherent light source 1202 to which light guide 1203 is coupled. A detecting device 1204 consisting of photo-detector elements 1241–1245 is connected to a discriminating device 1205. A drawing tool 1206 such as, for instance, a pencil or a pen is connected to one arm of a pantograph 1207 and is employed for drawing on a sheet of paper 1208.

At one end "A" of the pantograph 1207, the drawing tool 1206 is attached, and the paper 1208 is placed below the drawing tool 1206. On another end "B" of the pantograph 1207, which is moved similarly to the movement of the "A" end, a tip end of the light guide 1203 is fixed, and recording plate 1201 is arranged directly below the tip of light guide 1203. It should be noted that the tip of light guide 1203 is fixed to end "B" of the pantograph so that the coherent light beam from the tip end is emitted onto the recording plate 1201 at a constant angle of incidence.

According to the present embodiment, since an arbitrary pattern is depicted on the paper 1208 by means of the drawing tool 1206, the desired pattern is accurately depicted, remaining a visible trace or locus of the drawing on the paper. Furthermore, as the tip of light guide 1203 is moved along the surface of recording plate 1201 in a manner drawing a similar locus to that of the drawing tool, and the tip of light guide 1203 is always maintained at a constant angle against the surface of recording plate 1201, the hand written information on the paper provided by the drawing tool is directly converted into the corresponding digital electric signals at detector 1204 and without the use of an analog-to-digital converter.

Although, in the embodiment of FIG. 12, a pantograph is employed as the means of depicting a locus similar to that of the drawing tool 1206 on recording plate 1201, any one of the known diagram conversion means may be also employed for the same purpose.

In the embodiment of FIG. 12, a flexible fiber glass or a self-focusing optical fiber is employed for leading the coherent beam from the coherent light source to an illuminating means, but as the movable scope of the irradiating means is limited by the flexibility of the fiber glass or the self-focusing optical fiber, the fiber glass or the self-focusing optical fiber cannot often follow the movement of the illuminating means. On the other hand, it is possible to reproduce the recorded information in the interference fringes by a light having a short coherency distance.

FIG. 13 shows an embodiment including a luminescent element in an indicating means, so that there is no need to lead a coherent ray from a laser light source through the fiber glass and the like as in the case of the embodiment of FIG. 12. As a result, the size of the indicating means may be reduced and the movable scope and freedom of the indicating means may be enlarged.

In the embodiment of FIG. 13 a number of small holograms 1311 are arranged on a recording plate 1301, although it is to be understood that slit-like holograms of the type illustrated in FIG. 3 may also be employed as well. A substantially point-like source 1302 radiates a monochromatic or substantially monochromatic light such as, for example, a luminescent diode. A power supply 1322 drives point light source 1302, and a lens 1303 collimates the light produced by the point light source. Point light source 1302 and lens 1303 in combination constitute an indicator section. A detector section 1304 consisting of photo-detector elements 1341–1345 is coupled to a discriminating means 1305. Moving means 1306 is provided for moving the indicator section. It is assumed that power supply 1322 is turned on and point light source 1302 radiates a light, that light is collimated by means of lens 1303 into a parallel light beam. Accordingly, when a small hologram 1311 on plate 1301 is indicated by means of the indicator section (in FIG. 13, the position of (2,2) is indicated), the collimated light projected onto this small hologram is diffracted according to the interference fringes of the coded positional information such as, for instance, (0,1,0,1,0) recorded thereon corresponding to the position (2,2) of small hologram 1311. The diffracted beams from this small hologram are projected only onto photo-detector elements 1342 and 1344 in detector section 1304, which elements are disposed in the emitting direction of the diffracted beams from the respective small holograms. Consequently, the output electric signals from detector section 1304 take the form of (0,1,0,1,0), which are identified by means of discriminating means 1305 after they have been amplified, whereby the position indicated by the indicator section may be identified. Therefore, if the indicator section is moved by means of moving means 1306 to depict any arbitrary figure on the recording plate 1301, a train of digital electric signals representing the locus of the figure is emitted from the photo-detector elements 1341–1345. As described, since the digital signal train emitted from photo-detector elements 1341–1345 has a one-to-one correspondence with respect to the respective small holograms 1311 indicated on the recording plate 1301, this electric signal train can be fed as an input directly into an information processing apparatus, and there is no need to detect the indicated position on the recording plate 1301 with respect to its X-axis and Y-axis locations and to then encode them by an analog-to-digital converter. As a result, the apparatus can be extremely simplified with respect to its electric circuit.

In addition, in the tablet device according to the embodiment of FIG. 13, it is also required that a monochromatic or substantially monochromatic point light 1302 be supported on the recording plate 1301 always at a constant angle of incidence. If the angle of incidence is not constant but is fluctuating, the diffracted beams cannot be projected properly on the detector section 1304, so that there exists a large possibility of transmitting incorrectly coded positional information from detector section 1304. Therefore, correct coded positional information can be obtained by a structure having an indicating means and an irradiating means separately at a moving section as shown in FIG. 10, FIG. 11 or FIG. 12 without forming the indicator section and the irradiating section in an integral structure, and the irradiating means is maintained at a constant angle of incidence on the recording plate 1301 by this structure.

Although the aforementioned embodiment employed a luminescent diode as a monochromatic or substantially monochromatic point light source, a structure consisting of a lamp provided with a pin hole and a monochromatic filter, also affords the same functions and advantages as those of the illustrated embodiment.

As described, according to the embodiment of FIG. 13, there is no need to employ a flexible light guide such as, for instance, a glass fiber or a self-focusing optical fiber, so that the movement of the indicator section or the irradiating means may be facilitated, and also the movable scope of the movable range may be broadened.

As herein described, the present invention, owing to the fact that any arbitrary hand-written information depicted by the moving means can be directly converted into digital signals on the recording plate, a transmission and/or a display of any arbitrary hand-written information is enabled without making use of a complex electric circuit. In other words, according to the present invention, the recording plate itself is given with a function of encoding, and thereby the omission of an electric circuit is realized.

While several embodiments of the present invention have been herein specifically described it will be apparent that modifications may be made therein all without departing from the spirit and the scope of the invention.

We claim:

1. A tablet device comprising at least one sheet of recording plates having an array of holograms thereon, each of said holograms having coded positional information corresponding to the position of the hologram recorded therein, drawing means movable along a locus of an arbitrary pattern on said sheet and which includes means for indicating selected ones of said holograms corresponding to the arbitrary movement of said drawing means and means for illuminating a collimated, substantially monochromic beam onto said holograms, means arranged in a predetermined direction with respect to said recording plate for detecting diffracted beams in accordance with said coded information from the illuminated ones of said holograms during the movement of said drawing means, and means coupled to said detecting means for identifying coded signals corresponding to said coded information, whereby an information signal relating to said pattern described by said drawing means is obtained.

2. The tablet device of claim 1, in which said recording plate consists of a number of small holograms in which two-dimensional coded information is respectively recorded.

3. The tablet device of claim 1, in which there are two of said recording plates arranged in close contact with one another, each of said plates including a plurality of slit-like holograms, each of said holograms recording one-dimensional coded information corresponding to the position of said slit-like hologram, the holograms in one of said plates being arranged substantially perpendicular to the holograms in the other of said plates.

4. The tablet device of claim 3, further comprising a coherent light source, and light guide means extending from said coherent light source to said illuminating means.

5. The tablet device of claim 4, in which said light guide means is a flexible optical fiber.

6. The tablet device of claim 1, further comprising a coherent light source, and light guide means extending from said coherent light source to said illuminating means.

7. The tablet device of claim 6, in which said light guide means is a flexible optical fiber.

8. The tablet device of claim 1, further comprising a photochromic plate positioned adjacent said recording plate for displaying the locus of said drawing means.

9. The tablet device of claim 8, further comprising an infrared light source for bleaching said photochromic plate, a source of monochromatic light, an ultraviolet light source, and first and second light guide means respectively extending between said monochromatic light source and said ultraviolet light source and said indicating means.

10. The tablet device of claim 1, further comprising means for maintaining said beam at a predetermined angle of incidence with respect to said recording plate.

11. The tablet device of claim 10, in which said beam angle maintaining means comprises cooperating magnetic means on said indicating means and said illuminating means.

12. The tablet device of claim 10, in which said beam angle maintaining means comprises first and second guide means held at a constant angle with respect to each other, said illuminating means being slidably mounted on one of said guide means, and said one of said guide means being slidably mounted on the other of said guide means.

13. The tablet device of claim 12, further comprising cooperating magnetic means carried by said indicating means and said illuminating means.

14. The tablet device of claim 10, in which said beam angle maintaining means comprises drawing means for tracing a predetermined locus, and means mechanically linking said drawing means and said illuminating means so that the locus of the latter corresponds to that of the former.

15. The tablet device of claim 14, in which said linking means comprises a pantograph.

16. The tablet device of claim 1, further comprising a light source for providing said substantially monochromatic beam mounted in said drawing means.

17. The tablet device of claim 16, further comprising lens means also mounted in said drawing means for collimating said beam.

18. A recording plate for use in providing positional information in binary form, said plate comprising an array of holograms formed thereon, each of said holograms containing coded positional information in at least one dimension corresponding to the respective position of the individual hologram in said array.

* * * * *

UNITED STATES PATENT OFFICE

CERTIFICATE OF CORRECTION

Patent No. 3,658,402 Dated April 25, 1972

Inventor(s) Nobuo Nishida; Mitsuhito Sakaguchi

It is certified that error appears in the above-identified patent and that said Letters Patent are hereby corrected as shown below:

IN THE CAPTION:

Foreign Application Priority Data should have been indicated as follows:

--Foreign Application Priority Data

July 4, 1969 Japan........................44/52497
July 4, 1969 Japan........................44/52498
July 4, 1969 Japan........................44/52499
July 4, 1969 Japan........................44/52500
July 4, 1969 Japan........................44/52501
Oct. 16, 1969 Japan........................44/83023
Dec. 11, 1969 Japan........................44/99083--.

Signed and sealed this 26th day of September 1972.

(SEAL)
Attest:

EDWARD M.FLETCHER,JR.
Attesting Officer

ROBERT GOTTSCHALK
Commissioner of Patents